United States Patent [19]
Cardenas et al.

[11] 3,799,264
[45] Mar. 26, 1974

[54] SURFACTANT OIL RECOVERY PROCESS FOR USE IN FORMATIONS CONTAINING HIGH CONCENTRATIONS OF POLYVALENT IONS SUCH AS CALCIUM OR MAGNESIUM

[75] Inventors: Ricardo L. Cardenas; Joseph T. Carlin; Kenoth H. Flournoy, all of Houston, Tex.

[73] Assignee: Texaco Inc., New York, N.Y.

[22] Filed: Dec. 13, 1972

[21] Appl. No.: 314,868

[52] U.S. Cl. ................................. 166/275, 166/273
[51] Int. Cl. ............................................. E21b 43/22
[58] Field of Search........ 166/274, 275, 273, 305 R; 252/8.55 D

[56] References Cited
UNITED STATES PATENTS

| | | |
|---|---|---|
| 3,302,713 | 2/1967 | Ahearn et al. ........................ 166/274 |
| 3,360,043 | 12/1967 | Braden, Jr. et al. .................. 166/272 |
| 3,444,931 | 5/1969 | Braden, Jr. ........................... 166/305 R |
| 3,468,377 | 9/1969 | Dunlap et al. ........................ 166/274 |
| 3,508,612 | 4/1970 | Reisberg et al. ..................... 166/275 X |
| 3,515,214 | 6/1970 | Finch ..................................... 166/274 X |
| 3,675,716 | 7/1972 | Farmer et al. ........................ 166/275 |

Primary Examiner—Stephen J. Novosad
Attorney, Agent, or Firm—T. H. Whaley; C. G. Ries

[57] ABSTRACT

A surfactant composition usable in the presence of from about 500 to about 5,000 parts per million polyvalent ion concentrations, such as calcium and/or magnesium, comprising a sulfated aliphatic anionic surfactant such as sodium tridecyl sulfate, a water soluble guanidine salt such as guanidine hydrochloride, and a nonionic surfactant such as polyethoxylated aliphatic alcohol.

19 Claims, 5 Drawing Figures

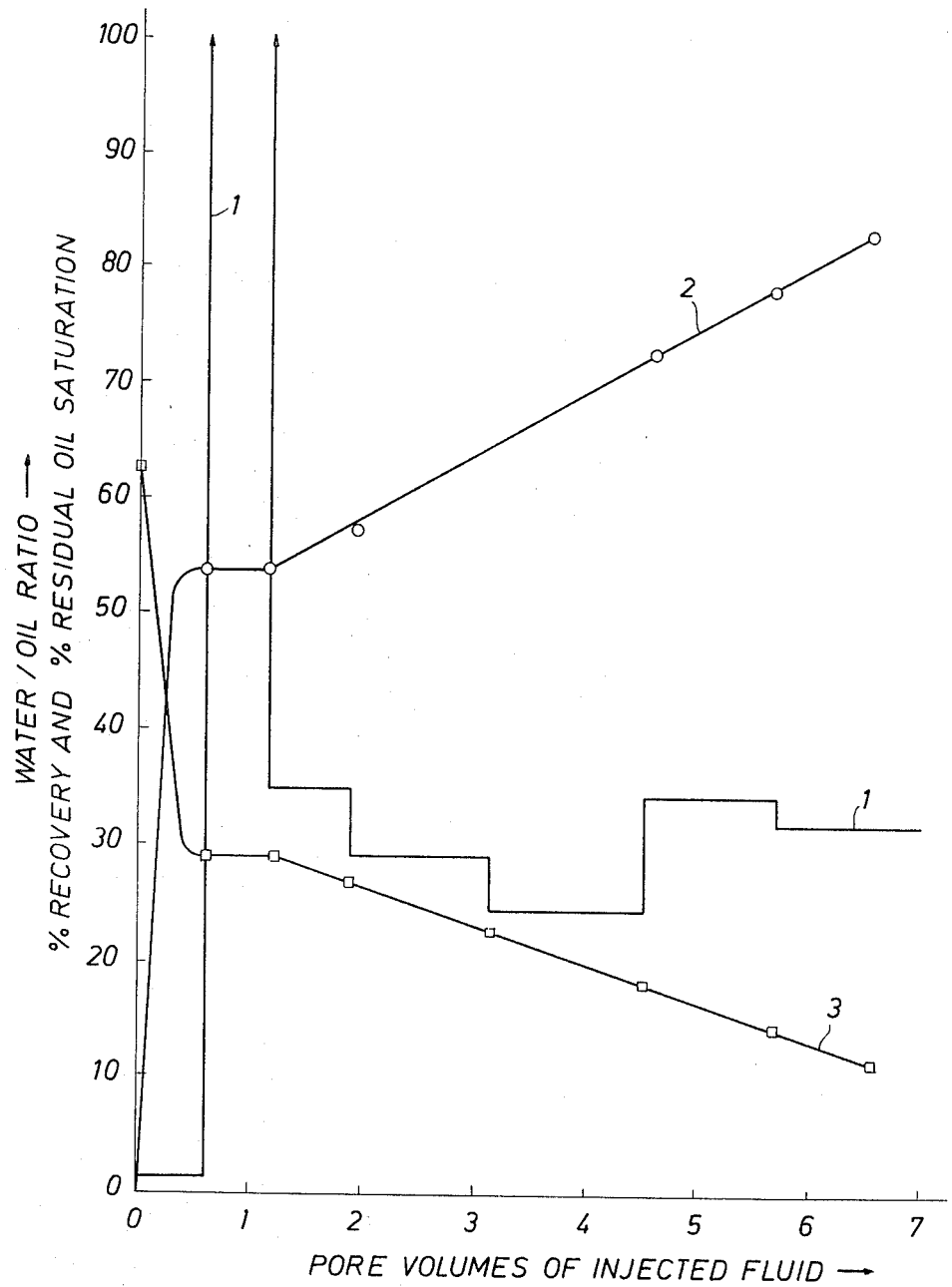

SURFACTANT OIL RECOVERY PROCESS FOR USE IN FORMATIONS CONTAINING HIGH CONCENTRATIONS OF POLYVALENT IONS SUCH AS CALCIUM OR MAGNESIUM

BACKGROUND OF THE INVENTION

1. Field of the Invention

This invention relates to a method for recovering petroleum from subterranean petroleum containing formations. More particularly, this invention relates to a surfactant flooding method of recovering petroleum from a petroleum containing formation. Still more particularly, this invention pertains to a novel surfactant mixture which will function effectively in the presence of high polyvalent ion (such as calcium or magnesium) levels which cause precipitation of conventional surfactants.

2. Description of the Prior Art

Petroleum is found in subterranean formations or reservoirs in which it has accumulated, and recovery is initially accomplished by pumping or permitting the petroleum to flow to the surface of the earth through wells drilled into the subterranean formation for that purpose. Petroleum can be recovered from subterranean formations only if certain conditions are present. For example, there must be an adequately high concentration of petroleum in the formation, and there must be sufficient porosity or interconnected flow channels throughout the formation to permit the flow of fluids therethrough if sufficient pressure is applied in the fluid. When the subterranean petroleum containing formation has natural energy present in the form of an underlying active water drive, solution gas, or a high pressure gas cap above the petroleum within the formation, this natural energy is utilized to recover petroleum. In this primary phase of petroleum recovery, petroleum flows to wells drilled in the formation for this purpose, from which it is withdrawn to the surface. When this natural energy source is depleted, or in the instance of those formations which do not originally contain such natural energy sources to permit primary recovery operations, some form of supplemental recovery process must be used. Supplemental recovery is frequently referred to as secondary recovery, although in fact it may be primary, secondary or teritary in sequence of employment.

The supplemental recovery operation involving the injection of water into the formation for the purpose of displacing petroleum toward the production wells, commonly referred to as water flooding, is the most economical and widely practiced supplemental recovery method. Water does not displace petroleum with high efficiency, however, since water and oil are immiscible, and the interfacial tension between water and oil is quite high. Persons skilled in the art of oil recovery have recognized this weakness of water flooding and many additives have been described in the prior art for decreasing the interfacial tension between the injected water and the formation petroleum. For example, U.S. Pat. No. 2,233,381 (1941) disclosed the use of polyglycol ether as a surface active agent to increase the capillary displacement efficiency of an aqueous flooding medium. U.S. Pat. No. 3,302,713 discloses the use of a petroleum sulfonate prepared from the 850° to 1,050° F. boiling range fraction of petroleum crude as a surfactant for use in an oil recovery operation. U.S. Pat. No. 3,468,377 (1969) describes the use of petroleum sulfonates of specified molecular weight for oil recovery. Other surfactants which have been proposed for oil recovery include alkyl pyridinium salts, alkyl sulfates, alkyl sulfonates, and quaternary ammonium salts.

The above-described surfactants are quite effective in many reservoirs which have formation waters with calcium and magnesium concentrations below about 500 parts per million. Petroleum sulfonate is one of the most popular and desirable surfactants because of its high surface activity and low unit cost, and it is the preferred surfactant when the formation water hardness is low enough to permit its use. Unfortunately, all surfactants which have heretofore proposed for oil recovery operations have a high sensitivity to polyvalent ions in the formation water. Petroleum sulfonate, for example, can be used only when the total hardness (calcium plus magnesium) of the formation water is less than 500 parts per million. Formation water having above about 500 parts per million calcium and/or magnesium causes rapid precipitation of petroleum sulfonate.

Many formations are known to exist which contain polyvalent ions such as calcium and magnesium in concentrations far in excess of 500 parts per million. The most common of such reservoirs are limestone formations which may have polyvalent ion concentrations from 500 to 15,000 parts per million in the original connate water, and from 500 to 5,000 parts per million polyvalent ion concentration in the formation water after the formation has been subjected to waterflooding. Since surfactants usable for oil recovery precipitate when used in aqueous environment having calcium and/or magnesium concentration in excess of 500 parts per million, such materials could not be used in limestone reservoirs. If a petroleum sulfonate solution, for example, were injected into a limestone reservoir, the material would precipitate on contacting the high calcium containing formation water. In such an application, the flood water would have essentially no surfactant present in it to decrease the interfacial tension between water and petroleum. Furthermore, the precipitated petroleum sulfonate plugs the porous formation, decreasing the formation injectivity, and thereby causing a substantial decrease in the oil displacement efficiency.

Nonionic surfactants, such as ethoxylated alkylphenols, ethoxylated aliphatic alcohols, carboxylic esters, carboxylic amides, and polyoxyethylene fatty acid amides, have a somewhat higher tolerance of polyvalent ions such as calcium or magnesium than anionic surfactants. While it may be technically feasible to employ a nonionic surfactant solution to decrease the interfacial tension between the injected aqueous displacing medium and petroleum in some limestone formations, such use would not be economically feasible since nonionic surfactants are not as effective as the more commonly used anionic surfactants and also because nonionic surfactants have a higher cost per unit weight than anionic surfactants.

SUMMARY OF THE INVENTION

This invention pertains to a means for recovering petroleum from a subterranean petroleum containing formation, which formation also contains water having a polyvalent ion content, for example, calcium and/or magnesium, in excess of 500 parts per million, which prevents the use of surfactants normally used for oil recovery procedures. The novel surfactant solution is comprised of from about 0.010 to about 1.25% by weight of a sulfated aliphatic anionic surfactant such as sodium tridecyl sulfate, from about 0.05 to about 5% by weight of a soluble guanidine salt such as guanidine hydrochloride, and from about 0.02 to about 0.5% by weight nonionic surfactant such as a polyethyloxylated aliphatic alcohol. From about 0.2 pore volumes to about 0.50 pore volumes of the surfactant solution is injected into the formation. The surfactant solution may be displaced through the formation by injecting water. Alternatively, a quantity of thickened water may be injected immediately after the surfactant solution to more efficiently displace it through the formation, after which water is injected to displace the surfactant solution and displaced oil through the formation. Any hydrophilic polymer normally usable for mobility improvement in oil recovery, such as polyacrylamide or polysaccharide may be used as a water thickener to displace the novel surfactant solution of this invention.

BREIF DESCRIPTION OF THE DRAWINGS

FIG. 5 illustrates the results of a laboratory core displacement test comprising first conventional water flood and then the novel surfactant combination of this invention.

DESCRIPTION OF THE PREFERRED EMBODIMENTS

Figure 1:
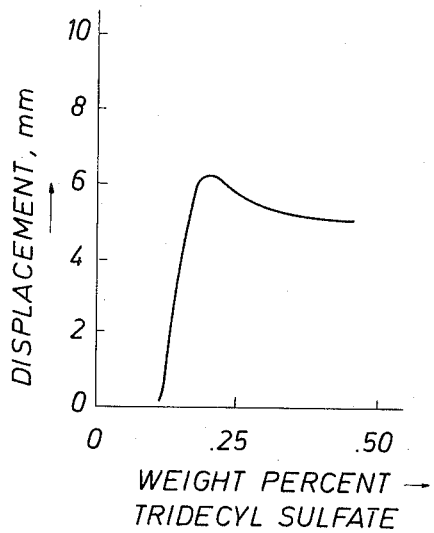
FIG. 1 illustrates the results of a capillary displacement test utilizing a water soluble guanidine salt and a nonionic surfactant with the sulfated aliphatic anionic surfactant concentration varied from 0 to 0.5%.

This invention concerns a novel chemical surfactant system which can be used in limestone or other subterranean formations containing "hard water," or water having polyvalent ions such as calcium and/or magnesium dissolved therein in excess of about 500 parts per million. Many petroleum containing formations which contain water having calcium and/or magnesium concentrations in excess of 500 parts per million are known but cannot be exploited by means of surfactant water flooding because all surfactants previously proposed for oil recovery are insoluble or otherwise ineffective about 500 parts per million total hardness.

We have found that an aqueous solution of three materials, in a critical concentration range, will effectively reduce the surface tension between oil and water, and will function efficiently in the presence of calcium and magnesium in a concentration of from about 500 to about 5,000 parts per million total hardness. The chemical system comprises:

1. A sulfated aliphatic surfactant having the following general formula:

$$R - SO_4 \cdot M$$

where R is an aliphatic chain having from 8 to 20 carbon atoms inclusive, and M is a water soluble cation such as sodium, potassium, or ammonia.

2. A water soluble guanidine compound, and 3. A nonionic surfactant of the polyethoxylated aliphatic alcohol class.

The term surfactant encompasses a broad spectrum of compounds which share the following common characteristics:

1. The compound must be at least slightly soluble in at least one phase of a liquid system,
2. The compound must have an amphipathic structure (the molecule is composed of groups of opposing solubility tendencies). For use in oil recovery operations, the molecule must have at least one hydrophobic or oil soluble group and at least one hydrophilic or water soluble group.
3. The surfactant molecules or ions must form oriented monolayers at phase interfaces.
4. The equilibrium concentration of a surfactant in any particular solute at a phase interface is greater than the concentration of the surfactant in the bulk of the solution.
5. The material must tend to form micelles or aggregates of molecules or ions whenever the concentration exceeds a certain limiting value which is a characteristic of the particular surfactant and solute.
6. The material must exhibit some combination of the following functional properties: detergency, foaming, wetting, emulsifying, solubilizing and dispersing.

Surfactants are generally clsssified on the basis of the hydrophilic or water soluble group or groups attached to the molecule.

1. The anionic surfactants, wherein the hydrophilic or water soluble group is a carboxylate, sulfonate, sulfate or phosphate group, are the most important class. The anionic surfactants are readily available, inexpensive and very surface active, and are generally the surfactant of choice in any particular application unless there is some compelling reason to resort to the use of a different kind of compound. Petroleum sulfonates are currently very popular for oil recovery, and are prepared by isolating a preselected boiling range fraction of a crude oil and subjecting it to sulfonation.
2. The cationic surfactants employ primary, secondary, or teritary amines or quaternary ammonium groups as the hydrophilic or water soluble group.
3. Nonionic surfactants have no charge when the material is dissolved in an aqueous media. The hydrophilic tendency is derived from oxygen atoms in the molecule which hydrate by hydrogen bonding to water molecules present in the solute. The strongest hydrophilic moiety in this class of comppound is an ether linkage, and there must be a plurality of these linkages present to render the compound sufficiently water soluble to exhibit surface activity. Polyoxyethylene surfactants having recurring ether linkages such as the following:

$$-CH_2 - CH_2 - O - CH_2 - CH_2 - O- \qquad (2)$$

are examples of hydrophilic moieties for nonionic surfactants. The molecule may have more than one chain containing ether linkages, and as much as 60 to 70% by weight of such chain must be present on the molecule in order to render the molecule sufficiently water soluble for it to function as a surfactant.

Nonionic surfactants are more efficient in the presence of high concentration of calcium and magnesium than are anionic surfactants, and they will function in limestone formations or other subterranean petroleum containing formations where calcium and/or magnesium concentrations of 500 parts to 5,000 parts per million are encountered. Nonionic surfactants are not a particularly desirable choice for the principal surfactant, however, because of their high cost per unit weight and low surface activity.

The nonionic surfactant used in our formulation functions primarily as a solubilizer or activator for the sulfated aliphatic anionic surfactant, and only a very small concentration is used, in the range of about 0.05 to about 0.2% by weight. In this small concentration range the high unit cost of the material does not adversely affect the economics of the oil recovery process. The nonionic surfactant used in the laboratory experiments described later in this sepcification was a polyethoxylated aliphatic alcohol. Other nonionic surfactants such as carboxylic esters, carboxylic amides, or polyoxyethylene fatty acid amides, may also be used in our formulation.

Guanidine, the amidine of carbamic acid, has the following structure:

(3)

Guanidine may be synthesized from urea by alkylating the basic form of urea to form an imido ester of urea, which reacts with ammonia to form guanidine. Guanidine is very soluble in water, and there are also several water soluble salts of guanidine. For example, guanidine hydrochloride, guanidine acetate and guanidine sulfate are very soluble in water. In addition, guanidine carbonate, guanidine thiocyanate, and guanidine nitrate are sufficiently soluble to permit their use in the subject invention. Guanidine hydrochloride is a particularly desirable guanidine salt, and it is the material used in the test to be described later hereinafter.

The mechanism responsive for the improvement resulting from the use of a small amount of a water soluble guanidine compound in the surfactant solution is not understood. There are references in the prior art indicating that guanidine reacts according to the following equation:

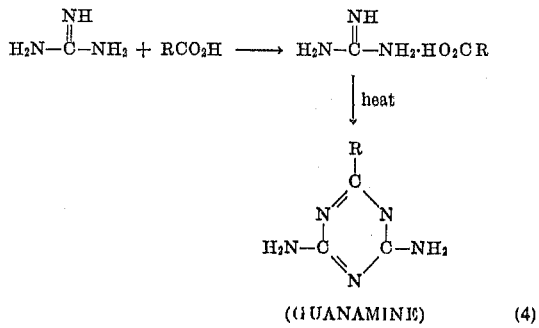

(GUANAMINE)         (4)

and it is possible that a similar complex is formed with the tridecyl sulfate used in the composition of our invention.

Whatever mechanism is responsive, however, we have found that the inclusion in a mixture of anionic surfactant and nonionic surfactant, of a small amount of water soluble guanidine compound will substantially improve the solubility and effectiveness of the surfactants in the presence of high concentrations of calcium and magnesium.

In practicing this invention, from about 2 to about 50 pore volume percent of an aqueous solution containing from about 0.125% to about 1.25% and preferably from about 0.025% to about 0.125% sulfated aliphatic anionic surfactant such as sodium tridecyl sulfate, from about 0.05 to about 5 and preferably about 0.5 to about 1.5% by weight of a water soluble guanidine salt such as guanidine hydrochloride, and from about 0.02 to about 0.5 and preferably from about 0.05 to about 0.2% by weight nonionic surfactant such as a polyethoxylated aliphatic alochol, is injected into the formation. The formation to which this invention will be applied will ordinarily be a limestone formation, although any subterranean petroleum containing formation having water containing in excess of about 500 parts per million calcium and/or magnesium can effectively be exploited by means of the subject process. If the viscosity of the formation petroleum is sufficiently high that a mobility ratio improver is deemed to be necessary, from about 2 to about 50 pore volume percent of an aqueous solution of a hydrophilic polymer such as polyacrylamide or polysaccharide may be injected into the formation subsequent to the injection of the surfactant solution. Use of hydrophilic polymer in a concentration of from about 200 to about 500 parts per million, which produces an apparent viscosity of the mobility buffer solution of from about 5 to about 15 centipoise, will improve the mobility ratio between the mobility buffer solution and the surfactant solution sufficiently to improve the displacement efficiency of the surfactant solution. Whether or not the mobility buffer solution is used, the final phase will comprise injecting water to displace the surfactant solution and displaced oil through the formation to the production wells. Water injection will be continued until the water-oil ratio rises to about 30 to 40.

The invention can be more fully understood by reference to the following field example, which is offered only for purpose of illustration and is not intended to be limitative or restrictive of the invention, which will be defined more fully hereinafter in the claims.

FIELD EXAMPLE

A subterranean, petroleum containing limestone formation was discovered at a depth of 8,500 feet. The limestone formation was 40 feet thick and the porosity was 30%. The field was exploited first by primary production, utilizing a square grid pattern with 500 foot line spacing between wells. At the conclusion of primary recovery, which recovered only 25% of the original petroleum in place in the reservoir, injection wells were drilled in the center of each square pattern to convert the field to an inverted five spot pattern for water injection. Although a large field entails a multiplicity of the square grid patterns, each 500 feet on a side and with an injection well in the center, it is possible to analyze the entire field by considering only a single square grid unit. Water was injected into the injection wells and production of oil was continued from the production wells until the water-oil ratio reached 30, which was considered to be the economic limit for continued production. At the conclusion of the water flooding operation, only 45% of the original oil in place in the reservoir had been recovered, and some form of teritary recovery operation had to be resorted to recover any significant portion of the remaining petroleum. The total pore volume swept by the injected fluid equals: 500 feet × 500 feet × 40 feet × 0.30 × 0.70 = 2,100,000 cubic ft. A 10% pore volume slug, comprising 0.21 million cubic feet or 1.57 million gallons of an aqueous solution containing 0.25% by weight tridecyl sulfate, 1% by weight guanidine hydrochloride and 0.1% Retzanol TD-15, a 15 mole ethylene oxide adduct of tridecyl alcohol, nonionic surfactant (produced by Retzloff Chemical Company) was injected into the formation. This surfactant solution was followed by injection of 1 million gallons of water having dissolved therein 250 parts per million of polyacrylamide, a hydrophilic polymer, to increase the viscosity of the water to about 8 centipoise, to displace the surfactant solution. Finally water was injected into the formation to displace the surfactant and thickened water solutions, together with the displaced oil through the formation and toward the production wells. Water injection was continued until the water-oil ratio rose to about 30, at which point the residual oil saturation was 12% and approximately 84% of the original oil in place had been recovered.

EXPERIMENTAL

In order to establish the operability of this invention, and further to determine the optimum ratio of the various constituents, the following experimental work was performed.

A synthetic formation water was prepared, the composition of which is given in Table I below.

TABLE I

Synthetic Limestone Formation Water

| | |
|---|---|
| $CaSO_4$ | 0.3% by weight |
| $CaCl_2$ | 0.4% by weight |
| $MgCl_2 6H_2O$ | 1.0% by weight |
| $NaHCO_3$ | 0.1% by weight |
| $NaCl$ | 1.4% by weight |

Some precipitation of salts occured; however, the water was saturated with cations of the various salts used in formulating the synthetic formation water, and resulted in a representative hard water containing 2,000 parts per million calcium ion and 1,000 parts per million magnesium ion. This synthetic formation water was utilized in all the capillary displacement tests described below.

Crude oil was obtained from the Slaughter Field, Hockley County, Texas, and was used to fill a number of identical dead-end glass capillaries. The oil-filled capillaries were submerged in the aqueous solution, which consisted of the above-described formation water plus the various additives to be tested. The only force tending to displace oil from the tube was the force resulting from the difference in densities of the two fluids. This was offset by the interfacial tension between the oil and the formation water. The distance in millimeters traveled by the meniscus up the capillary in a 5 minute exposure to the chemical system was recorded, and this observation is plotted in FIGS. 1 through 4, which will be described more fully below. There was essentially no displacement of the meniscus in the instance of capillary tubes submerged in the formation water containing no surfactant of any kind, indicating that the interfacial tension between the crude and the formation water was too great to permit displacement of the oil from the capillary.

FIG. 1 illustrates the capillary displacement observed in a system having 1% guanidine hydrochloride and 0.1% Retzloff TD-15, a polyethoxylated aliphatic alochol nonionic surfactant, in a series of tests in which 0, 0.125, 0.25 and 0.375 by weight sodium tridecyl sulfate was added to the aqueous solution. The anionic surfactant used was Sapex TDS, a 25% active ingredient sodium tridecyl sulfate sold by Alcolac Chemical Company. It can be seen that even at a concentration of 0.125% sodium tridecyl sulfate, essentially zero displacement of the meniscus occurred. The displacement increased rapidly as the percetate of tridecyl sulfate was increased from 0.125% with the maximum displacement of 6 millimeters occurring at a concentration of approximatley 0.1875% tredecyl sulfate. A slight decline from this maximum is observed, although excellent displacement was obtained in the range from 0.175% to about 0.375% tridecyl sulfate.

Figure 2:
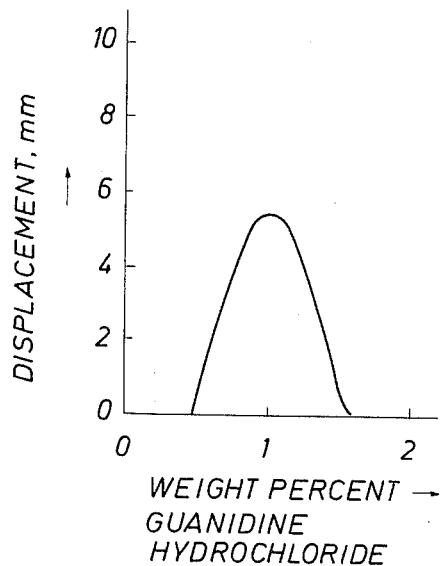
FIG. 2 illustrates the results of capillary displacement tests utilizing a mixture of sulfated aliphatic anionic surfactant and a nonionic surfactant when the soluble guanidine salt concentration is varied from 0 to 1.5%.

FIG. 2 illustrates the displacements observed in a similar series of tests wherein the aqueous environment in all instances contained 0.25% by weight tridecyl sulfate and 0.1% of the nonionic surfactant and the percent guanidine hydrochloride was varied from about 0 to about 1.5%. It can be seen that from 0 to about 0.5% by weight guanidine hydrochloride, the mixture of sodium tridecyl sulfate and the nonionic surfactant was ineffective for reducing the surface tension of the oil-aqueous phase system involved, but from about 0.5 to about 1.5 by weight guanidine hydrochloride a significant reduction in the surface tension was achieved. The optimum reduction in surface tension was realized at about 1% by weight guanidine hydrochloride.

Figure 3:
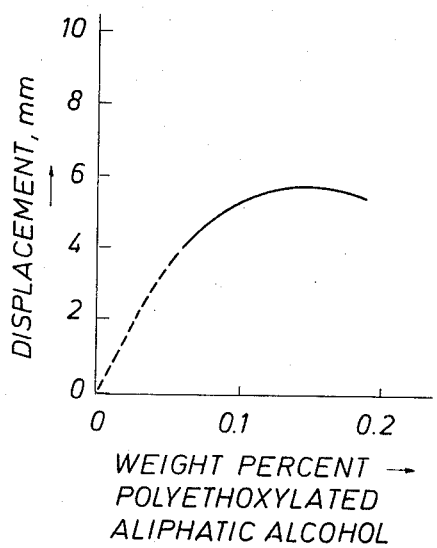
FIG. 3 illustrates the results of capillary displacement tests utilizing sulfated aliphatic anionic surfactant and a water soluble guanidine salt with the nonionic concentration varied from 0 to 0.2%.

FIG. 3 illustrates the displacements observed in a series of tests in which the aqueous environment contained 0.25% sodium tridecyl sulfate and 1% guanidine hydrochloride and the concentration of the nonionic surfactant was varied from 0 to 0.15% by weight. The curve is shown dashed from 0% to about 0.05% nonionic surfactant, since no displacement of the crude from the glass capillaries was observed, and further, the sodium tridecyl sulfate and guanidine hydrochloride precipitated from the aqueuos environment. With as little as 0.05% by weight of the nonionic surfactant, the sodium tridecyl sulfate and guanidine hydrochloride were solubilized, and the capillary displacement measurement indicated the surface tension between the crude petroleum and the aqueous fluid was reduced. The optimum concentration of the nonionic surfactant solution was from about 0.05 to about 0.2% by weight.

The three series of capillary displacement experiments illustrated graphically in FIGS. 1, 2, and 3 and described above, demonstrate that a chemical system has been disclosed which exhibits a synergistic interaction to function in the high calcium and magnesium aqueous environment in a manner that no one or combination of any two of these materials will do. FIG. 1 illustrated that a mixture of guanidine hydrochloride and the nonionic surfactant is ineffective without at least 0.125% sodium tridecyl sulfate; FIG. 2 demonstrates that a mixture of 0.25% tridecyl sulfate and 0.1% nonionic surfactant is ineffective without at least 0.5% guanidine hydrochloride, and FIG. 3 demonstrates that a mixture of 0.25% tridecyl sulfate and 1% guanidine hydrochloride is ineffective without at least 0.05% nonionic surfactant.

Corresponding capillary tests in the above described formation water using petroleum sulfonate as the surfactant could not be performed because of the immediate precipitation of petroleum sulfonate on contacting these high concentrations of calcium and magnesium.

Figure 4:
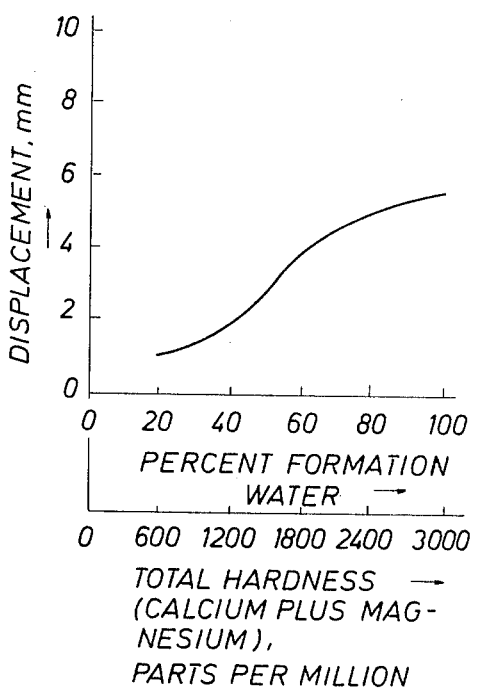
FIG. 4 illustrates the results of capillary displacement tests utilizing all three components in the surfactant blend with varying mixtures of the high calcium and magnesium containing produced water from a limestone reservoir and distilled water.

Another series of capillary displacement tests were performed to measure the response of the optimum blend of 0.25% tridecyl sulfate, 1% guanidine hydrochloride and 0.1% nonionic surfactant, to varying concentrations of calcium and magnesium. The specified concentration of the three essential components were tested in varying mixtures of the synthetic limestone formation water with distilled water, to yield an aqueous environment having total hardness of from 600 to 3,000 parts per million. The capillary displacements measured under these conditions is illustrated in FIG. 4. It can be seen that the use of the three specified ingredients not only results in a surfactant composition which can tolerate the high total hardness of the formation water, but the composition functions more effectively at the higher total hardness levels that at the lower total hardness levels. This is evidenced by the fact that approximately 6 millimeters displacement was obtained utilizing the 100% formation water corresponding to a total hardness of 3,000 parts per million, whereas only about 1 millimeter capillary displacement was obtained utilizing 20% formation water and 80% distilled water yielding a total hardness (calcium + magnesium) of about 600 parts per million.

In order to study the displacement performance of the optimum composition of the mixture of sodium tridecyl sulfate, guanidine hydrochloride and polyethoxylated aliphatic alcohol nonionic surfactant water under controlled laboratory conditions, a displacement test was conducted in a linear core obtained in the Salem Field, Salem, Ill. The core was saturated with Slaughter connate water, which contained approximately 15,000 parts per million calcium, and 4,200 parts per million magnesium. This was then displaced with crude oil obtained from the Slaughter Field, Hockley County, Texas. A simulated water flood was conducted using 30% Slaughter formation water and 70% distilled water, yielding an injection fluid having a calcium concentration of approximately 4,500 parts per million and a magnesium concentration of approximately 1,300 parts per million, corresponding to a total hardness of 5,800 parts per million. The results, shown in FIG. 5, depict the water-oil ratio 1, the percent oil recovery 2, and the residual oil saturation 3 as a function of pore volumes of injected fluid. It can be seen that total oil recovery increased rapidly during water flooding to approximately 50% at the break through of the injected fluid, at which time the water-oil ratio 1 increased rapidly from a very low value to greater than 100. The surfactant fluid consisting of 0.25% tridecyl sulfate, 1.0% guanidine hydrochloride, and 0.1% polyethoxylated aliphatic alcohol anoinic surfactant, was injected at this point. The water-oil ratio declined to around 34 and continued to decline thereafter as increasing pore volumes of fluid was injected into the core. The percent total oil recovery began increasing with increasing pore volumes of injected fluid, and finally reached approximately 82% recovery after 7 pore volumes of fluid had been injected into the core. The residual oil saturation was reduced from about 30 at the initiation of the surfactant flood to around 12 at the conclusion of the test. The water-oil ratio remained in the vicinity of 35 during the continuation of this test, which is a satisfactory level. The use of the surfactant solution resulted in the recovery of approximately 60% more oil than had been recovered at the conclusion of the formation water.

Thus we have disclosed and demonstrated that the use of an aqueous solution having from about 0.0125% to about 1.25% by weight sulfated aliphatic anoinic surfactant such as sodium tridecyl sulfate, and from about 0.05 to about 5% by weight of a water soluble guanidine compound such as guanidine hydrochloride, and from about 0.02 to about 0.5% by weight nonionic surfactant such as a polyethoxylated aliphatic alcohol, will effectively function as a surfactant in the presence of hard water, e.g., water having from about 500 to about 5,000 parts per million total hardness (calcium plus magnesium). While only one anionic surfactant, one nonionic surfactant and one guanidine compound have been disclosed in the examples, many other such materials will be apparent to those skilled in the art of surfactant flooding oil recovery, and it is intended that the true spirit and scope of this invention be determined only by the claims which are appended below.

We claim:

1. In a method for recovering petroleum from a subterranean, petroleum containing, porous formation, said formation containing water having polyvalent ions dissolved therein in a concentration in excess of 500 parts per million, said recovery method being of the type wherein an aqueous fluid is injected into the formation and oil displaced by the injected fluid is recovered from the formation, wherein the improvement comprises injecting into the formation an aqueous surfactant solution comprising:

a. a sulfated aliphatic anionic surfactant,
b. a nonionic surfactant; and
c. a water soluble guanidine compound.

2. A method as recited in claim 1 wherein the sulfated aliphatic anionic surfactant has from 8 to 20 carbon atoms inclusive.

3. A method as recited in claim 2 wherein the sulfated aliphatic anionic surfactant is sodium tridecyl sulfate.

4. A method as recited in claim 1 wherein the water soluble guanidine compound is selected from the group consisting of guanidine, guanidine hydrochloride, guanidine acetate, guanidine sulfate, guanidine thiocyanate, guanidine carbonate, and guanidine nitrate.

5. A method as recited in claim 4 wherein the water soluble guanidine salt is guanidine.

6. A method as recited in claim 4 wherein the water soluble guanidine salt is guanidine hydrochloride.

7. A method as recited in claim 4 wherein the water soluble guanidine compound is guanidine acetate.

8. A method as recited in claim 4 wherein the water soluble guanidine compound is guanidine sulfate.

9. A method as recited in claim 4 wherein the water soluble guanidine compound is guanidine thiocyanate.

10. A method as recited in claim 4 wherein the water soluble gaunidine compound is guanidine carbonate.

11. A method as recited in claim 4 wherein the water soluble guanidine compound is guanidine nitrate.

12. A method as recited in claim 1 wherein the nonionic surfactant is a polyethoxylated aliphatic alcohol.

13. A method as recited in claim 1 wherein the concentration of sulfated aliphatic anionic surfactant is from about 0.0125 to about 1.25 percent by weight.

14. A method as recited in claim 1 wherein the concentration of sulfated aliphatic anionic surfactant is from about 0.025 to about 0.125 percent by weight.

15. A method as recited in claim 1 wherein the concentration of nonionic surfactant is from about 0.02 to about 0.50 percent by weight.

16. A method as recited in claim 1 wherein the concentration of nonionic surfactant is from about 0.05 to about 0.20 percent by weight.

17. A method as recited in claim 1 wherein the concentration of water soluble guanidine compound is from about 0.05 to about 5 percent by weight.

18. A method as recited in claim 1 wherein the concentration of water soluble guanidine compound is from about 0.50 to about 1.50 percent by weight.

19. A method as recited in claim 1 wherein from about 2 percent pore volumes to about 50 percent pore volumes of surfactant solution are injected into the formation.

* * * * *

UNITED STATES PATENT OFFICE
CERTIFICATE OF CORRECTION

Patent No. 3,799,264    Dated March 26, 1974

Inventor(s) Ricardo L. Cardenas, Joseph T. Carlin, Kenneth H. Flournoy

It is certified that error appears in the above-identified patent and that said Letters Patent are hereby corrected as shown below:

Column 4, line 17, "of", second occurrence, should read -- with --.

In Table 1, column 7, line 41, reading "MgCl$_2$6H$_2$O" should read -- MgCl$_2$.6H$_2$O --.

Column 8, line 9, reading "0.125" should read -- 0.0125 --.

Column 8, line 16, reading "percentate" should read -- percentage --.

Column 8, line 19, reading "approximatley" should read -- approximately --.

Column 8, line 47, reading "aqueuos" should read -- aqueous --.

Column 9, line 25, reading "that" should read -- than --.

Column 9, line 37, omit the word "water".

Column 10, line 66, reading "qaunidine" should read -- guanidine --.

Signed and sealed this 24th day of September 1974.

(SEAL)
Attest:

McCOY M. GIBSON JR.          C. MARSHALL DANN
Attesting Officer            Commissioner of Patents